(12) United States Patent
Larvet

(10) Patent No.: US 8,417,512 B2
(45) Date of Patent: Apr. 9, 2013

(54) METHOD, USED BY COMPUTERS, FOR DEVELOPING AN ONTOLOGY FROM A TEXT IN NATURAL LANGUAGE

(75) Inventor: Phillippe Larvet, Forges les Bains (FR)

(73) Assignee: Alcatel Lucent, Paris (FR)

( * ) Notice: Subject to any disclaimer, the term of this patent is extended or adjusted under 35 U.S.C. 154(b) by 1157 days.

(21) Appl. No.: 11/857,420

(22) Filed: Sep. 18, 2007

(65) Prior Publication Data

US 2008/0071521 A1   Mar. 20, 2008

(30) Foreign Application Priority Data

Sep. 19, 2006  (FR) ...................................... 06 53814

(51) Int. Cl.
*G06F 17/27* (2006.01)
(52) U.S. Cl.
USPC ........... 704/9; 704/1; 704/10; 704/7; 704/257
(58) Field of Classification Search .................. 704/9, 1, 704/10, 7, 257
See application file for complete search history.

(56) References Cited

U.S. PATENT DOCUMENTS 6,651,220 B1 * 11/2003 Penteroudakis et al. ...... 715/236
7,548,848 B1 * 6/2009 Deb et al. .......................... 704/9
2003/0191627 A1 * 10/2003 Au .................................... 704/9

* cited by examiner

*Primary Examiner* — Qi Han
(74) *Attorney, Agent, or Firm* — Fay Sharpe LLP

(57) ABSTRACT

The invention relates to a method, used by computers, for developing an ontology (70) of a text (10) in natural language, comprising the steps of:
  receiving text data from the text (10);
  extracting the syntax and meaningful words (20) from the text via a grammatical analysis (S100) of the received data;
  for each of at least some of the meaningful words (20) of the text: searching (S200) for a definition (40) of that word (20) by means of at least one electronic dictionary (30, 35), extracting the syntax and the meaningful words of that definition, and creating (S300) an elementary lexical graph (50) of that definition based on the syntax and the meaningful words of that definition; and
  merging (S400) at least two of the elementary lexical graphs (50) created, as a function of the syntax of the text, so as to create at least one semantic graph (60) of the text.

The invention further concerns a computer program product and an electronic data processing system comprising code means adapted to implement the steps of the method of the invention.

15 Claims, 2 Drawing Sheets

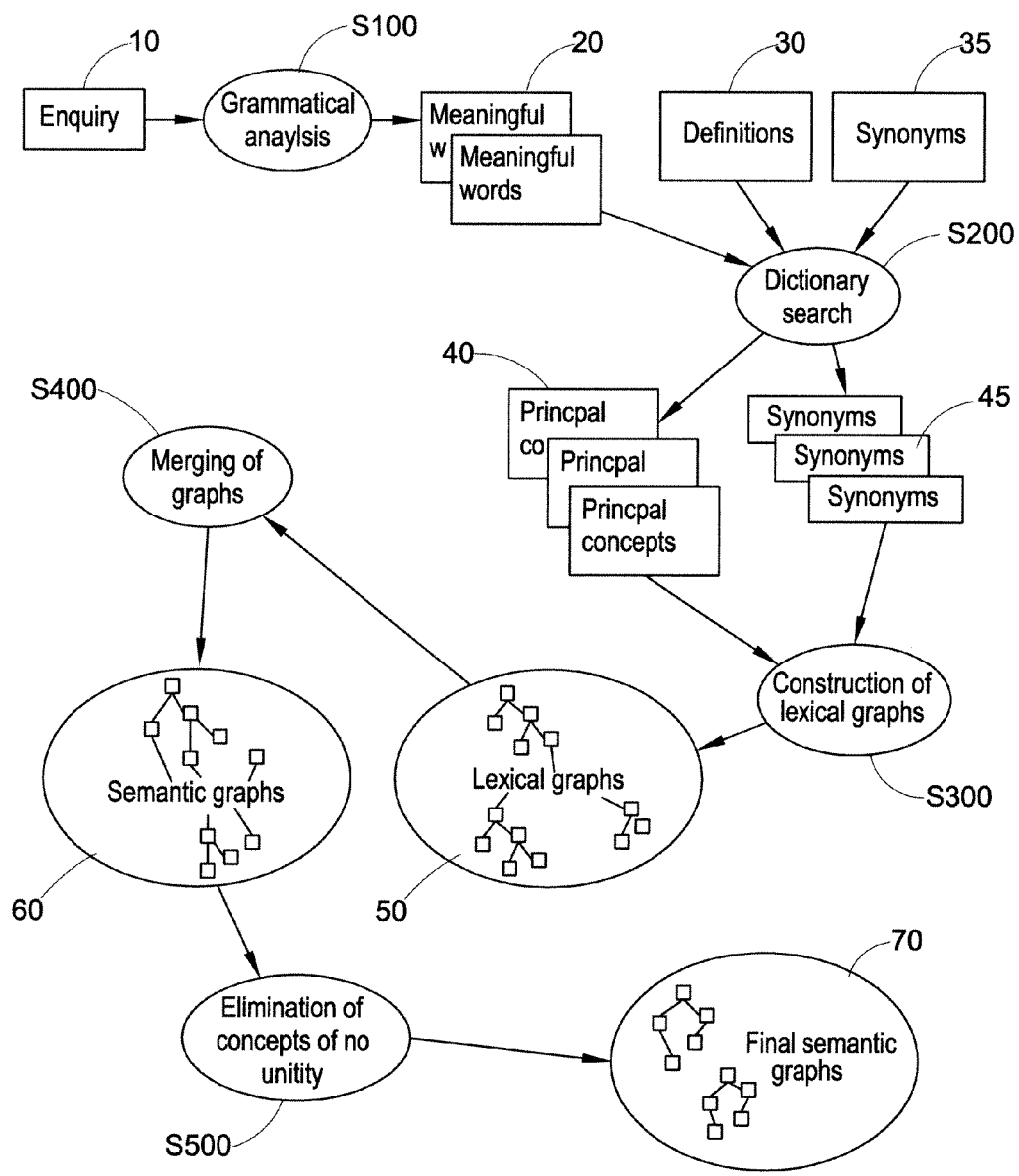
FIG_1

FIG_2
| I | Personnal pronoun | Is subject of | Want |
|---|---|---|---|
| Want | Verb, active voice | Has for subject | I |
| French | Adjective | Is epithet of | Translation |
| Translation | Name | Is direct complement of the verb | Want |
| CNN | Acronym | Name / adjective complement of | News |
| News | Name | Name complement of | Translation |
FIG_3
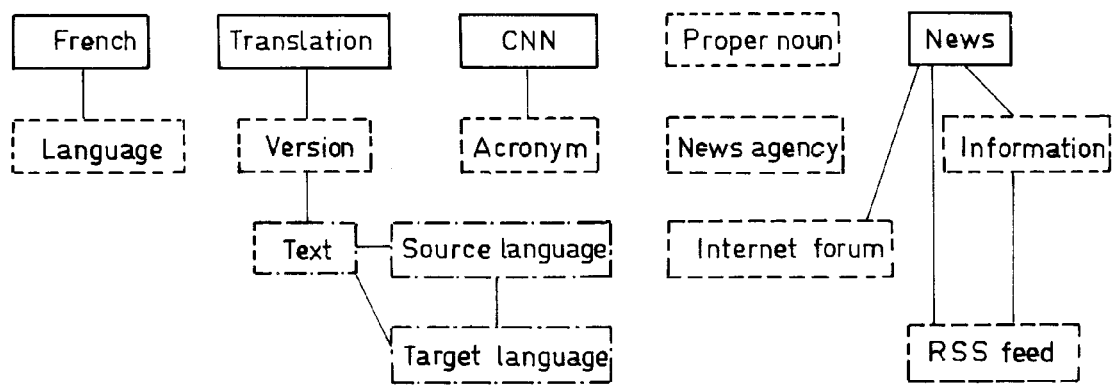
FIG_4
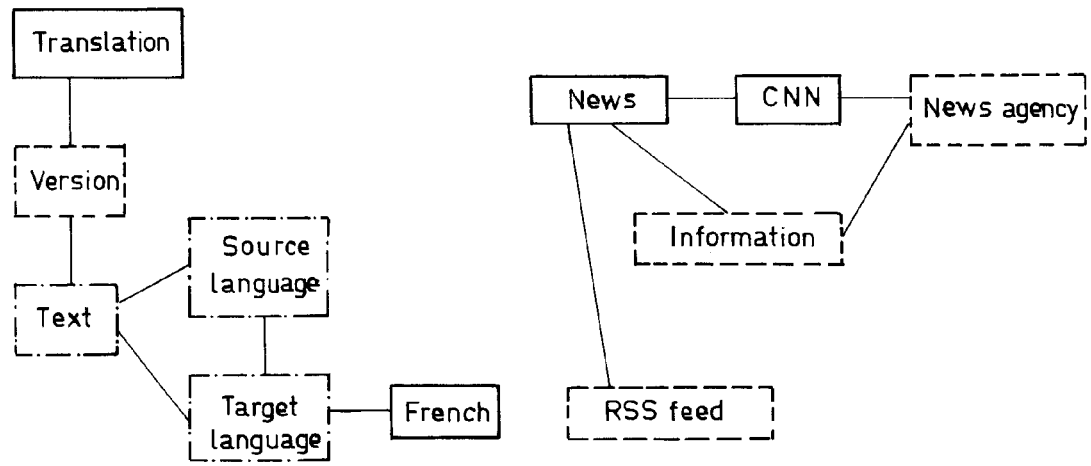

METHOD, USED BY COMPUTERS, FOR DEVELOPING AN ONTOLOGY FROM A TEXT IN NATURAL LANGUAGE

BACKGROUND

The present invention concerns ontologies in general. It relates more particularly to a method, used by a computer, for developing an ontology from a text in natural language.

In the present description, the following terms are employed with the meaning indicated, unless specifically indicated:

"Ontology": an ontology is a structured set of organized concepts, for example organized into a graph the relations whereof can be semantic relations or relations of composition and inheritance (in the object sense). An objective of an ontology is to model a set of knowledge in a given domain.

"OWL" is a Web ontology language designed for applications that must not only present users with information but also process the content thereof. OWL is an XML "dialect" based on an RDF (Resource Description Framework) syntax, which designates a graph model for describing metadata and for certain automatic processing of that metadata. OWL provides means for defining structured Web ontologies. The OWL language offers machines greater capacities for interpreting Web content than usual, for example using XML, thanks to a supplementary vocabulary and a formal semantic. OWL is made up of three sub-languages offering increasing expressivity: OWL Lite (or OWL) OWL DL and OWL Full. OWL-S (where S stands for "semantic") is "semantic" oriented, as yet exists only as a proposal and has not been standardized.

"Web service" designates an application accessible on the INTERNET, via a standard interface, that can interact dynamically with applications or other Web services using communication protocols, for example based on XML, independently of the operating system and the programming languages used. At the level of its interfaces as such, a Web service comprises processing operations that supply results based on input data or "input parameters". To use a Web service, one of its operations is called, and supplied with the expected input data, and the output result is recovered.

"UML" (Unified Modeling Language): designates a notation (rather than a language) for modeling by means of objects, used to determine and to present the components of an object system during its development, and where applicable to generate its documentation. UML is currently the OMG standard. It results from merging the work of Jim Rumbaugh, Grady Booch and Ivar Jacobson, and has evolved in numerous ways.

"Semantic Web" designates an extension of the World Wide Web used to publish, consult and above all automate the processing of formalized knowledge, which means that documents processed by the semantic Web contain, instead of texts in natural language, formalized information to be processed automatically.

"XML" (extensible Markup Language): an evolution of the SGML language, which is used in particular by HTML document designers to define their own markers, with the aim of personalizing the data structure.

Modern telecommunication technologies, in particular the Internet, enable users to access a variety of services quickly. In this field, the semantic Web is in full expansion, especially where applications for developing services with the aid of existing services, using a semantic approach, are concerned. In this regard, more and more Web services are provided with an ontology or, more generally, a semantic description.

In this context, the present inventor has set himself the objective of finding a solution to the following problem: automatically producing a semantic description (for example via a semantic graph or, in other words, an ontology) of a text in natural language. That text could, for example, correspond to a user enquiry written in natural language. Having a semantic description of such an enquiry would facilitate the search for a Web service corresponding to that enquiry, for example.

At present there is no automatic solution to this problem. A manual solution is known, which consists in "manually" establishing semantic descriptions using a semantic tool such as Protégé or MindManager, or even a UML modeling tool such as Rational Rose, Softeam Objecteering, IBM-Rational XDE or Microsoft UML Visio. In fact, by virtue of its specific construction, UML can cover all the conceptual elements required for a semantic description: inheritance, relations of aggregation or association, attributes, stereotypes, elementary data and labeled values, constraints, etc.).

However, such a solution is not satisfactory, mostly because it is entirely manual. It is consequently lengthy to implement and prone to errors. Moreover, this solution is subjective: the result depends on the user. The result of this is a lack of uniformity in the descriptions obtained.

There is therefore a need for a solution for producing automatically (i.e. by computer) a semantic description of a text in natural language from text data corresponding to that text.

SUMMARY

The invention proposes a method, used by computers, for developing an ontology of a text in natural language, comprising the steps of:
  receiving text data from the text;
  extracting the syntax and meaningful words from the text via a grammatical analysis of the received data;
  for each of at least some of the meaningful words of the text: searching for a definition of that word by means of at least one electronic dictionary, extracting the syntax and the meaningful words of that definition, and creating an elementary lexical graph of that definition based on the syntax and the meaningful words of that definition; and
  merging at least two of the elementary lexical graphs created, as a function of the syntax of the text, so as to create at least one semantic graph of the text.

Preferred embodiments of the method of the invention have one or more of the following features:
  the method of the invention further comprises a step, before the merging step, of extracting relations between the meaningful words of the text based on the syntax and the meaningful words of the text that have been extracted, the merging step being based on these relations between meaningful words of the text;
  the extraction first step further comprises the extraction via the grammatical analysis of a grammatical structure of the text, said structure comprising one or more grammatical groups; and the merging step is further based on extracted grammatical groups, so as to create at least one semantic graph for each of said one or more extracted grammatical groups;
  the method of the invention further comprises a step, for each meaningful word of the text, of searching for synonyms of that word and a definition of those synonyms by means of said at least one dictionary and the merging step is further effected as a function of the definitions of the synonyms;

the method of the invention further comprises a step, before the merging step, of classifying the synonyms found for each meaningful word as a function of the definitions of that meaningful word and its synonyms; and the merging step is further effected as a function of a result of the classification of the synonyms;

the method of the invention further comprises a step of eliminating components not linked to said at least one semantic graph that has been created;

each of the steps, apart from the step of reception of the text data, is effected "on the fly", after the step of reception of the text data;

said at least one semantic graph is formalized in a language based on XML, such as OWL or RDF;

the text data corresponds to a text of a service enquiry.

The invention also proposes a method for searching for a Web service comprising the steps of receiving said at least one semantic graph created by the method of the invention for developing an ontology and searching for a Web service as a function of said at least one semantic graph that has been received.

The invention further concerns a computer program and an electronic data processing system comprising code means adapted to execute the steps of the method according to the invention.

BRIEF DESCRIPTION OF THE SEVERAL VIEWS OF THE DRAWINGS

Other features and advantages of the invention will become apparent on reading the following detailed description of embodiments of the invention, given by way of example only, and with reference to examples, and to the appended drawings, which show:

FIG. 1: a flowchart illustrating the steps and components of one embodiment of the method of the invention;

FIG. 2: a table illustrating a grammatical analysis effected on the text of a user enquiry in natural language;

FIG. 3: a set of elementary lexical graphs obtained from meaningful words extracted by the grammatical analysis illustrated in the FIG. 2 table; and FIG. 4: the graphs of FIG. 3, as obtained after steps of merging elementary lexical graphs and eliminating components not linked to the graphs.

DETAILED DESCRIPTION OF THE INVENTION

The basic idea of the invention is to develop an ontology (i.e. a semantic description) directly from text data of a text, using, on the one hand, the information produced by a grammatical analyzer and, on the other hand, elements found in one or more dictionaries, such as synonyms and definitions. In more detail, the method of the invention comprises a first step of reception of text data of the text. The syntax and the meaningful words are then extracted therefrom via a grammatical analysis of the data received. A definition of each meaningful word is then searched for using an electronic dictionary and the syntax and the meaningful words are extracted therefrom. An elementary lexical graph of that definition is then created, on the basis of the syntax and the meaningful words of that definition. The elementary lexical graphs corresponding to the meaningful words of the text are then merged. This merging is effected as a function of the syntax of the initial text, so as to create at least one semantic graph of the text. The solution that the invention provides is systematic and thus remedies the drawbacks linked to the "manual" development of an ontology of a text in natural language.

This process is preferably implemented in an "integrated" electronic data processing tool, for example an assistant or an application comprising a plurality of coupled software modules, each of those modules being assigned to a given task.

FIG. 1 shows a flowchart illustrating steps and components of one embodiment of the method of the invention.

Referring to that figure, text data 10 corresponding to the text in natural language is received first of all. For example, this text is that of an enquiry that a user sends from a PC, a personal digital assistant or a mobile telephone (for example by SMS).

In the step S100, the syntax (not represented in FIG. 1) and meaningful words 20 are extracted from the text via a grammatical analysis of the received data 10. That grammatical analysis comprises the analysis of the formal function of the words in the text, independently of the meaning (which concerns the semantic; this will be described later). This step can be implemented by means of a grammatical analyzer. Such tools are commercially available.

This step is exemplified in FIG. 2, which shows a table grouping the various aspects of a typical grammatical analysis effected on the text 10 in natural language. The enquiry comprises the text "I want to obtain a French translation of CNN news". After the analysis, only the meaningful words are retained, namely "I", "Want", "French", "Translation", etc. These are placed in the first column of the table starting from the left. The articles and linking words such as "a", "the" are set aside. In the next column the meaningful words are characterized (personal pronoun, verb, etc.). The last two columns highlight the relations between the meaningful words. For example, "I" is the subject of (the verb) "Want".

Referring again to FIG. 1, the method further comprises a step S200 of searching for a definition 40 of each extracted meaningful word M (M designates a meaningful word of the initial text). This step necessitates an electronic dictionary 30, typically a lexical dictionary, from which the definitions are extracted.

The syntax and the meaningful words m are then extracted from this definition, which are the foundation for the concepts 40 of that definition. It is necessary to distinguish the meaningful words m, which appear in the definition of a meaningful word M, from the word M itself. Extracting the syntax and the meaningful words from the definitions objectifies the concepts 40 of those definitions. This will also enable, if required, a meaningful comparison between definitions, which will in turn enable relations to be established between meaningful words M of the initial text. The consequence of this step is a first semantic valorization of the initial text.

In the step S300, an elementary lexical graph 50 is created for each definition, i.e. for each meaningful word M of the original text, based on the syntax and the meaningful words m of each definition. However, certain words, linked trivially to the meaning of the enquiry (for example "I" and "Want" in the FIG. 2 example) are preferably set aside. More generally, all the "meaningful" words are kept: substantives, verbs, adjectives, with the exception of the expressions characterizing the enquiry, such as "I want", "I wish", "I need", etc. Thus an elementary graph is constructed for each word M retained but this graph typically comprises meaningful words m of the definition of the word M. To some extent, this "elementary" graph therefore represents a "micro-ontology" of the word M.

The method preferably further comprises a step of searching for synonyms 45 of each meaningful word M of the initial text, as well as searching for a definition of those synonyms. The synonym search can, for example, take the form of a systematic search for synonyms of words from the definition of a meaningful word M. For this purpose, this search can use a dictionary 35 separate from the dictionary 30 of definitions. However, the same database could be used, combining definitions and synonyms of words. The definition of the synonyms is typically objectified in the same way as that of the meaningful words M of the initial text.

Furthermore, the synonyms of a word are preferably classified as a function of the respective definitions of that word and its synonyms. Only the "main" synonyms are typically retained, as a function of the result of the classification. "Main" synonyms means, for example, those for which the concepts of the definition are for the most part the same as those of the reference meaningful word.

Thus an elementary graph can include synonyms of the reference meaningful word M.

FIG. 3 shows elementary lexical graphs obtained from the meaningful words M extracted by means of the grammatical analysis described hereinabove (see the FIG. 2 table). Referring to that figure, elementary graphs are represented by the words "French", "Translation", "CNN" and "News". The subject and the verb have been set aside at this stage, their analysis having revealed the meaning of the user's enquiry. Thus only a portion of the meaningful words of the initial text can actually be the subject of an elementary graph creation.

The graphs show relations that stem from the extraction of the definitions. In the figure, a word surrounded by a continuous line is a meaningful word of the initial text. A dotted line indicates an inheritance relation (or, in other words, a class to sub-class relation), in the object sense. For example "French" inherits from "Language", as "CNN" inherits from "Proper name". Dashed lines indicate a synonym, while a chain-dotted line designates another type of relation, for example: "Text" is linked to "Source" or "Target" by a relation of the type "is written with". Moreover, "Source" and "Target" can be marked by a constraint implying that "Source" and "Target" must necessarily differ. This can be obtained by means of a simple external label. No such label is generated systematically, however, this depends on the richness of the definition that is used.

At this stage there are as yet only elementary graphs, constituting as many "micro-ontologies". The final ontology of the text results from merging these "micro-ontologies", as described next, with reference to FIG. 1 again.

The method of the invention further comprises a step S400 of merging at least two of the elementary lexical graphs 50 created, i.e. mergers of pairs of elementary graphs are systematically searched for.

Where appropriate, this merging is effected as a function of the syntax of the text and the meaningful words extracted (by the grammatical analysis), so as to create at least one semantic graph 60 of the initial text. This semantic graph subtends the required ontology.

As stated hereinabove, the grammatical analysis reveals the syntax and meaningful words of the initial text and thus uncovers the existence of relations between meaningful words of that text. Thus, in other words, the merging is effected at least on the basis of the existence of uncovered relations between the meaningful words of the initial text.

It should nevertheless be noted that the merging step can be based explicitly on these relations, i.e. can take account of the meanings of the relations over and above the mere fact of their existence. This means, for example, that the components (i.e. the words qua concepts) of the merged graph can be oriented more easily.

The grammatical analysis (step S100) preferably further comprises extraction of a grammatical structure from the initial text and, among other things, of one or more grammatical groups ("grammatical group" means a sub-set of words of a phrase interlinked by a simple grammatical relation, of the name complement ("CNN news"), attribute, epithet ("French translation"), etc. type). In the foregoing example, these groups are:

"I want" (group 1);
"French translation" (group 2);
"CNN news" (group 3).

The merger (step S400) is then attempted on the basis of the extracted grammatical groups, so as to create at least one semantic graph 60 for each of the grammatical groups. At least one lexical graph per group is then obtained. This is all the more advantageous in that a grammatical group generally reflects a coherent concept, the objects whereof are complementary or linked. The extracted grammatical structure can further include information linked to phrases, propositions, etc. In particular, the links between the grammatical groups can be used to stagger the progress of the merger. Thus the information relating to the grammatical structure assists with constructing the merger.

Similarly, the presence of synonyms and their definitions can impact on the merger, to the extent that they highlight relations between words from different lexical graphs. Those relations then assist with constructing the merger between those graphs.

In one embodiment, the merger is effected in a very simple way, taking into account both the grammatical structure of the enquiry and the value of (semantically) adjacent terms between different elementary lexical graphs. Where the grammatical structure is concerned, there is meant more specifically here the structure of the grammatical groups. Where the value of the (semantically) adjacent terms is concerned, the degree of "adjacency" depends on the relations that there may be between them (i.e. the relations linking words from different elementary lexical graphs). It should be noted that here these elementary graphs are those fabricated with words constituting a given grammatical group. In the example described hereinabove, for the group 1 "French translation", there are taken into account both its grammatical structure (the two words are linked together by a name-epithet relation) and the existing relations between the terms from the two elementary lexical graphs, for example "language", of the "French" side and "language" linked to "text" on the "translation" side (see FIG. 3).

It should be noted that some of the steps (S100-S400) described hereinabove can be interleaved for reasons of algorithm performance. For example, after reception of the enquiry, the steps of extracting the syntax and the meaningful words 20 from the text, of searching for their definitions, and of analyzing those definitions (S200) can be partially concomitant. Similarly, once a search for a word has ended, the construction of the corresponding elementary graph can begin, without waiting for the analysis of each of the words to end. In the same line of thinking, a merger search can be effected as soon as two graphs are available. These steps are therefore not necessarily effected one after the other.

Moreover, in one embodiment, the steps S100-S400 can be effected "on the fly" (as well as possibly being interleaved), following the step of reception of text data, for example in response to a user enquiry 10. This provides in particular for satisfying an enquiry emanating from a user. The user typically formulates his enquiry, and then an ontology of the enquiry (i.e. comprising at least one semantic graph 60) is generated and a corresponding Web service searched for.

The method preferably includes a step S500 of eliminating components not linked to the semantic graphs 60 that have been created. This eliminates graph portions of no utility and therefore, in the end, simplifies the processing. The final semantic graphs 70 are then obtained.

Reverting to the previous example, and with reference to FIG. 4, it is apparent in particular that the graphs relating to "French" and "Translation" have been merged. Remember that the table from FIG. 1 shows the existence of a grammatical relation between "French" and "Translation". The syntax and the meaningful words of the initial text therefore included elements necessary for the subsequent merging of the graphs relating to the words "French" and "Translation". More precisely, the particular relations between, on the one hand, the words "French" and "Translation" ("French" being an epithet of "Translation") and, on the other hand, between "Translation", "Text" and "Target language" (the latter being of a semantic nature) have enabled a semantic branch to be effected between "French" and "Target language", attached to "Translation" by way of the word/concept "Language". In this regard, it should be noted that the following definition of "translation" has been used in this example: "version of a text in a language (target language) different from that in which it was written (source language)".

Similarly, it has been possible to effect a merger between the concepts relating to "News" and "CNN".

Terms that are not linked, such as "Internet forum" or "Acronym" have also been eliminated.

Note further that the existence of relations between words or concepts does not necessarily lead to a merger. For example, despite the existence of a relation between "News" and "Translation", the two graphs present in FIG. 4 have not been linked.

In this regard, it can be advantageous not to seek (semantically) to widen each concept unduly in order to merge them all. This would lead to a single final graph that is too targeted, too personalized. There is little chance of a Web service corresponding to an enquiry that is too targeted. It is therefore better to aim at discovering a plurality of Web services each corresponding to one graph obtained from the enquiry. This obviously depends on the final aim: in other applications, merging a maximum of graphs might be the aim. The level of granularity of the final graphs can be adjusted and corrected in the light of experience. In the foregoing example, a relation (in the original enquiry) between "News" and "Translation" might have been discovered, but it is preferable not to create this link, which would make the final graph too personalized.

The semantic graphs 70 finally obtained can be simply formalized, for example in a language based on XML, such as OWL or RDF. The method described hereinabove therefore produces a coherent and systematic semantic description.

Of course, it is clear that the method works better if the initial enquiry 10 is well formulated and clear. In particular, it could advantageously take the form subject-verb-complement, and where applicable be graced with clear substantive complements.

The invention claimed is:

1. A computer implemented method for developing an ontology (70) of a text (10) in natural language, comprising the steps of:
   receiving text data from text (10);
   a grammatical analyzer extracting, by a computer, syntax and meaningful words (20) from the text via a grammatical analysis (S100) of the received text data;
   for each of at least some of the meaningful words (20) of the text: searching (S200) for a definition (40) of the meaningful word (20) by means of at least one electronic dictionary (30, 35), the grammatical analyzer extracting syntax and meaningful words of the definition, and creating (S300) an elementary lexical graph (50) of the definition based on the syntax and the meaningful words of the definition; and
   merging (S400), by the computer, at least two of the elementary lexical graphs (50) created, as a function of the syntax of the text, so as to create at least one semantic graph (60) of the text.

2. The method according to claim 1, further comprising a step, before the merging step (S400), of extracting relations between the meaningful words of the text based on the syntax and the meaningful words of the text that have been extracted via the grammatical analysis, the merging step being based on these relations between meaningful words of the text.

3. The method according to claim 1, wherein:
   the extraction first step further comprises the extraction via the grammatical analysis (S100) of a grammatical structure of the text, said structure comprising one or more grammatical groups; and
   the merging step (S400) is further based on extracted grammatical groups, so as to create at least one semantic graph (60) for each of said one or more extracted grammatical groups.

4. The method according to claim 1, further comprising a step, for each meaningful word of the text, of searching for synonyms (45) of that word and a definition of those synonyms by means of said at least one dictionary (35); and
   the merging step (S400) is further effected as a function of the definitions of the synonyms.

5. The method according to claim 4, further comprising a step, before the merging step, of
   classifying the synonyms found for each meaningful word as a function of the definitions of that meaningful word and its synonyms;
   and wherein:
   the merging step is further effected as a function of a result of the classification of the synonyms.

6. The method according to claim 1, further comprising a step (S500):
   of eliminating components not linked to said at least one semantic graph (60) that has been created.

7. The method according to claim 1, wherein each of the steps (S100-S400), apart from the step of reception of the text data, is effected "on the fly", after the step of reception of the text data.

8. The method according to claim 1, wherein said at least one semantic graph (70) is formalized in a language based on XML.

9. The method according to claim 8 wherein the language is Web Onology Language OWL.

10. The method according to claim 8 wherein the language is Resource Description Framework RDF.

11. The method according to claim 1, wherein the text data corresponds to a text of a service enquiry (10).

12. The method according to claim 1 further comprising searching for a Web service as a function of the at least one semantic graph (60).

13. The method according to claim 1 wherein the computer is an electronic data processing tool.

14. Electronic data processing tool adapted to develop an ontology of a text in a natural language comprising:
   a computer having code means adapted to: receive text data from text; extract the syntax and meaningful words from the text via a grammatical analysis of the received text data; for each of at least some of the meaningful words of the text search for a definition by means of at least one electronic dictionary, extract a syntax and meaningful words of the definition, and create an elementary lexical graph of the definition based on the syntax and the meaningful words of the definition; and merge at least two of the elementary lexical graphs created, as a function of the syntax of the text, so as to create at least one semantic graph of the text.

15. Electronic data processing tool adapted to develop an ontology of a text in a natural language comprising:
- means for receiving text data from text;
- means for extracting the syntax and meaningful words from the text via a grammatical analysis of the received text data;
- means for searching for a definition for each of at least some of the meaningful words by means of at least one electronic dictionary;
- means for extracting a syntax and meaningful words of the definition;
- means for creating an elementary lexical graph of the definition based on the syntax and the meaningful words of the definition; and
- means for merging at least two of the elementary lexical graphs created, as a function of the syntax of the text, so as to create at least one semantic graph of the text.

* * * * *